Patented Nov. 26, 1935

2,021,956

UNITED STATES PATENT OFFICE 2,021,956

CELLULAR AGGREGATE AND PROCESS

Andrew L. Gladney, San Francisco, Calif., assignor of one-half to Marshall S. Hanrahan, San Francisco, Calif.

No Drawing. Application July 25, 1932,
Serial No. 624,660

3 Claims. (Cl. 106—24)

This invention relates to cellular stones and process of making the same, and has for its objects an improved process for producing a cellular light weight siliceous stony material particularly useful as a light weight concrete aggregate, also the material itself as produced by the process. Other objects and advantages of the invention will appear in the following description.

The requirement for light weight concrete for special purposes is of course well known, and since the weight of a block of concrete depends principally on the weight of the crushed stone or other aggregate used for the inert material, various workers have suggested the use of various light weight materials to replace the stone or gravel usually used. Cinders have been used for this purpose as well as crushed brick, and naturally light cellular or porous stones such as pumice.

However, most of the materials being lacking in some desirable qualities, inventors have striven to produce artificial stones which were light and cellular without being porous, yet of sufficient mechanical strength to make good concrete. One prior patentee sought to slightly fuse natural pumice stone so as to contract the same somewhat to render it less porous and to increase its strength so that it would be suitable for use as a concrete aggregate (Patent No. 1,354,233). Others devised means of filling the concrete mass with gas or air bubbles while in fluid state so that when set it would be highly cellular, and in Patent No. 1,707,395 is disclosed a method of making a cellular or clinker-like stone from natural argillaceous material such as will harden upon burning, by subjecting the same at once to a high heat (in excess of 1500° F.) to gasify the contained organic matter and water vapors with almost explosive violence to expand the material and fill it with bubbles before the clay hardened under the action of the heat.

My process and product differ from all the above inasmuch as I am concerned primarily with the making of a cellular stone of siliceous material which, unlike argillaceous material, will not harden by heat but fuses by heat and hardens only upon cooling.

The raw material for my process is well consolidated tuff, also known as pumicite. This material runs high in silica, some samples about 80% bound together with some 6% of calcium as carbonate, some magnesium carbonate, iron oxide and free water under ordinary atmospheric conditions of about 5%, though when wet the free water can run as high as 50% or more, and in general appearance the natural rock resembles limestone and is free from visible pores or cells, being compact and fairly hard.

I have discovered that if this material in the solidified form is first crushed into sizes as usually used for concrete aggregate and heated under controlled conditions, it will be transformed into a cellular material with a grassy exterior, of considerably increased bulk, even to almost twice its original size, so that it will float on water, and, moreover, will continue to float for months as its cells are separated by impervious glass-like walls.

Since the heat treatment should be uniform in its action on the material in order to secure uniform results I preferably first screen the crushed raw material into various size grades and treat all of substantially one grade at a time to secure comparatively uniform heat penetration, though considerable latitude is permissible.

The material is then placed in a suitable kiln and a low heat slowly applied to gradually drive out the free water content and other volatiles. A suitable method of carrying this out I have found to be to run the hot gases of combustion from the main kiln through the material stacked in vertical cylinders and through which the material may be permitted to slowly descend for passage into the main heating kiln.

The preliminary heating should be gradually raised from atmospheric temperature to about 400° F. over a time period of about ten to twenty minutes. If applied too quickly it will shatter the pieces into small fragments as it is not plastic and the moisture vapors and gases require time to escape.

When the material is free from moisture it is passed into the main heating kiln where the temperature is increased to between 1600° F. and 1900° F. and under which heat it is maintained for a time period to cause incipient fusion and form a vitreous plastic coating over the exterior of each piece, the time of treatment depending on the average size of the pieces being treated. If the average size is about ¾ of an inch about fifteen minutes usually suffice, though a longer exposure will result in a thicker coating.

The heat penetrates each piece to render it slightly plastic throughout and also generates gases within which expand and fill the pieces with small unconnected bubbles so that the bulk is increased all the way up to twice the original size if desired, depending on the intensity and duration of the heat. The outer shell or coating being plastic at the heat of treatment and impervious will expand with the generation and enlargement of the gas bubbles within the slightly plastic interior, and when the material passes to a temperature below the point of fusion the bodies will become rigid.

The action of the heat in generating the gas within the bodies is not thoroughly understood but is thought due to driving out of the carbon dioxide from the calcium carbonate content as well as of the small percentage of magnesium carbonate and reaction of the resulting oxides with the silica at the high temperature into corresponding silicates, and if this be true it will be seen that any artificial mixture of finely divided silica with such a carbonate and proper fluxing agent such as iron oxide will respond similarly under similar heat treatment, the main requirement being that the material must soften and not harden under the heat treatment as would be the case with argillaceous material.

I find a rotating cement kiln as used for making Portland cement satisfactory for the second heat treatment as the rotation prevents objectionable agglutination of the pieces and keeps them broken apart, and gives them a chance to solidify in passing out of the zone of greatest heat before emerging from the kiln.

Pieces of all sizes may be produced by the process, but the treatment becomes more difficult with very large pieces on account of the tendency to excess vitrification on the outer surface before the reaction within has been carried far enough, and hence the heat must be applied more gradually. However, large pieces or blocks may be easily made by taking the material from the kiln while still slightly plastic and pressing it together under force sufficient to make the particles coalesce while avoiding unnecessary compression such as would increase its density too much.

Physically considered the individual pieces of the product are of varying sizes and shapes like stones with rounding corners, and they have an exterior glassy coating which is filled with many small pits caused by collapsed surface bubbles, also some rough spots where they have become broken or due to foreign matter contained in the raw material. Interiorly they have a cellular structure much like natural pumice stone except that the separating walls of the cells are more impervious, vitreous and glass-like. The strength of the pieces is superior to natural pumice stone and the weight is from ¾ to ½ that of the raw pumicite of equal bulk. When floated in water for several months the pieces show little or no absorption.

An evident modification of my process would be to heat-treat relatively large pieces and crush them to smaller required size after treatment. This would give rougher exteriors, but is not so economical as to crush and grade the raw material.

While the principal use of the material would seem to be as a light weight aggregate for use with Portland and various cements, it is also of importance as a heat insulating material and for which purpose it is best mixed with some of the same material finely crushed or powdered so as to fill the interstices between the larger pieces and thus form a space packing insulator.

In my appended claims the word "pumicite" is to be understood as including well consolidated tuff, and similar highly siliceous stone of more or less purity and varying characteristics, but excludes pumice or pumice stone which is a natural light vesicular material which will float on water, and which will contract and not expand with heat. The term also excludes such materials as "obsidian" which is a black vitreous volcanic glass, which will not work in my process.

Having thus described my invention, what I claim is:—

1. The process of making light cellular stony bodies which comprises subjecting broken pieces of well-consolidated tuff or pumicite to a temperature to cause incipient fusion and generation of gas within to substantially increase the bulk of the pieces, all while tumbling the pieces about to prevent agglutination.

2. The process of making light cellular stony bodies which comprises drying broken pieces of well-consolidated tuff or pumicite to drive out the free moisture, then subjecting the pieces to a temperature sufficient to cause incipient fusion and formation of smooth glassy exteriors and for a time period to generate gas pockets throughout the pieces and substantially increase their bulk, the pieces being tumbled about during the heating to prevent agglutination, and then cooling the product.

3. The process of making light cellular stony bodies which comprises subjecting broken pieces of well-consolidated tuff or pumicite to a temperature up to about 500° F. in a gradual manner to drive off the free moisture, then increasing the temperature to between 1500° F. and 2000° F. while constantly tumbling the pieces about until they become plastic increase greatly in bulk and gas bells or pockets are formed throughout their mass and a glass-like coating is formed on their exteriors, and then cooling the product.

ANDREW L. GLADNEY.